United States Patent [19]

Hirano et al.

[11] 3,961,678
[45] June 8, 1976

[54] SIMPLE ELECTRIC BICYCLE

[75] Inventors: Yukio Hirano; Akio Iwata, both of Kiryu, Japan

[73] Assignee: Mitsubadenkiseisakusho Company, Ltd., Kiryu, Japan

[22] Filed: Aug. 22, 1974

[21] Appl. No.: 499,635

[30] Foreign Application Priority Data
Sept. 11, 1973 Japan............................ 48-101651

[52] U.S. Cl. .............................. 180/33 D; 74/214; 180/34; 200/61.85; 180/33 C; 180/74
[51] Int. Cl.² .................. B62D 61/02; B60K 17/00; B62M 7/08
[58] Field of Search .............. 180/33 D, 33 C, 33 R, 180/34, 31, 26 R, 74, 77 R, 101, 99; 200/61.85, 61.87, 157; 74/202, 206, 214

[56] References Cited
UNITED STATES PATENTS

| 676,409 | 6/1901 | Berger ................................. 180/74 |
| 1,191,287 | 7/1916 | Devaux ............................ 180/33 D |
| 2,409,887 | 10/1946 | Murphy ........................... 180/33 D |
| 2,708,484 | 5/1955 | Hoffman ......................... 180/74 X |
| 2,717,654 | 9/1955 | Andersen ........................ 180/74 X |
| 3,339,659 | 9/1967 | Wolf ................................. 180/33 R |
| 3,773,131 | 11/1973 | Jaulmes ........................... 180/33 C |
| 3,841,428 | 10/1974 | Bialek ................................. 180/74 |

FOREIGN PATENTS OR APPLICATIONS

| 935,842 | 7/1948 | France .............................. 180/33 D |
| 466,236 | 10/1951 | Italy .................................... 180/34 |
| 85,334 | 1/1936 | Sweden ........................... 180/33 D |
| 443,948 | 2/1968 | Switzerland .................... 180/33 R |
| 730,901 | 6/1955 | United Kingdom ............ 180/33 D |
| 653,158 | 5/1951 | United Kingdom ............ 180/33 D |

Primary Examiner—M. H. Wood, Jr.
Assistant Examiner—John P. Silverstrim
Attorney, Agent, or Firm—Fidelman, Wolffe & Waldron

[57] ABSTRACT

This invention relates to a simple electric bicycle characterized in that a swing-arm is supported at a fulcrum provided at a position which is upper and outer side of a bicycle wheel and forward of a wheel axle in the freely swingable manner, the arm is provided with a motor at a position where a swinging circular arc of the swing-arm and an outer periphery of the wheel intersect each other, a driving roller is put around a motor shaft to convey a driving force of the motor to the wheel by contacting with a tire, and thereby a proper driving force can be obtained in proportion to a load.

7 Claims, 10 Drawing Figures

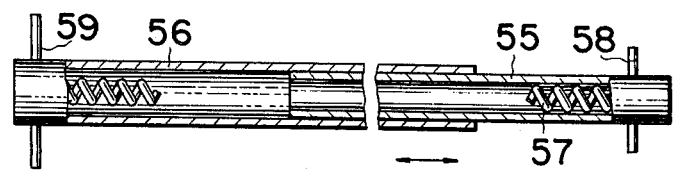
FIG.6
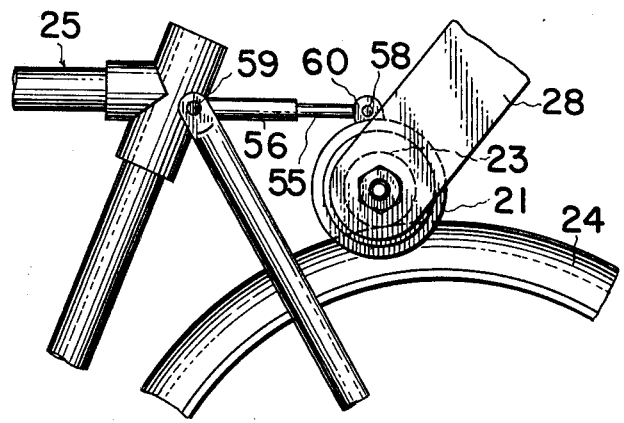
FIG.7
FIG.8
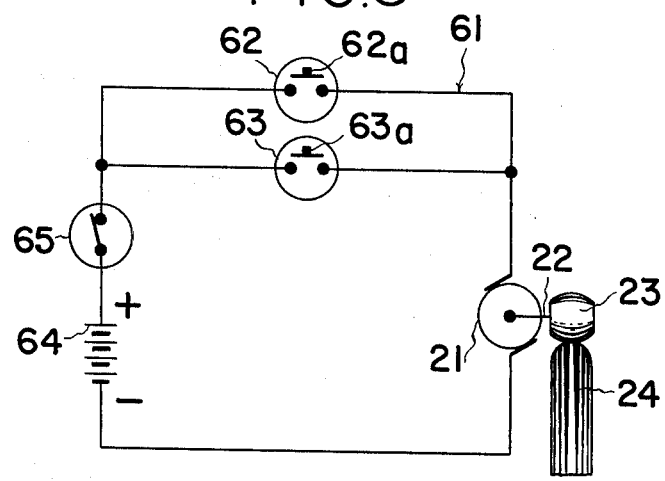

SIMPLE ELECTRIC BICYCLE

SUMMARY OF THE INVENTION

This invention relates to a simple electric bicycle.

An electric bicycle is provided with a driving roller around a rotating shaft of a small motor (for example, of up to 100 W) provided on a bicycle body and the roller is pressed onto a tire of the bicycle to convey a driving force to a wheel for running the bicycle. Furthermore if the pressure of the roller is released, the electric bicycle can be used as a normal bicycle.

In such an electric bicycle, the driving roller is pressed onto a tire by the weight of a motor or by the use of a spring and the like. However that pressure is always same while the bicycle is running, therefore an excessive pressure force is given at the time of low speed running and the pressure is not enough at the time of high speed. The excessive pressure force causes a defect that a running distance per one charging is decreased relating to the fact that a capacity of a storage battery is small in a bicycle driven by a small motor.

In order to dissolve the above defect, an electric bicycle shown in FIG. 1 was developed. In that bicycle, a fixing plate $a$ having a fulcrum A' is provided on an axle 27 of bicycle wheel 26, a motor 21 is provided at the forward end of a connecting rod $b$ supported by the fulcrum A', and further the motor 21 is connected with a supplementary attaching part $c$ fixed to a bicycle body 25 through a hinge $d$ in the manner that it is freely extended or contracted in order to restrict the movement of the driving position of the motor 21 due to a load.

However, in that bicycle, it has made clear that there are some defects that since it consists of an attaching plate $a$, a connecting rod $b$, a supplementary attaching part $c$, a hinge $d$, and many other parts, the structure is complicated, and since for the attachment of these parts, a carrier, a tyre cover and even a wheel axle have to be removed and reassembled, the attachment is difficult for a general person.

The object of the present invention is to improve the above electric bicycle so as to eliminate the defect, and to provide a practical one in which a frictional force proportional to a load is given to a part between a driving roller and a tyre to restrict the conveyance-loss of the driving force for the effective rotation of the wheel, and further since structure is simple, mass-production is possible and attachment can be done easily.

Other features of the present invention will be made clear by the detailed description of the invention.

BRIEF DESCRIPTION OF THE DRAWINGS

FIGS. 2 – 10 show some embodiments of the present invention;

FIG. 2 is a rough side elevation view to explain the principle of the first embodiment of the present invention;

FIG. 3 is a partial side elevation view showing the first embodiment concretely;

FIG. 4 is a sectional view along the line IV — IV of FIG. 5;

FIG. 5 is an enlarged sectional back view of a main part of FIG. 3;

FIG. 6 is a partially sectional plane view showing one embodiment of a vibration absorbing device;

FIG. 7 is a partial side elevation view showing the condition that the vibration absorbing device is attached to an electric bicycle of the first embodiment of the invention;

FIG. 8 is an electric circuit diagram showing one example of a driving circuit of a motor of the invention;

FIG. 9 is a side view showing the second embodiment of the invention; and

FIG. 10 is a sectional view along the line X — X of FIG. 9.

DETAILED DESCRIPTION OF THE INVENTION

Figure 2:
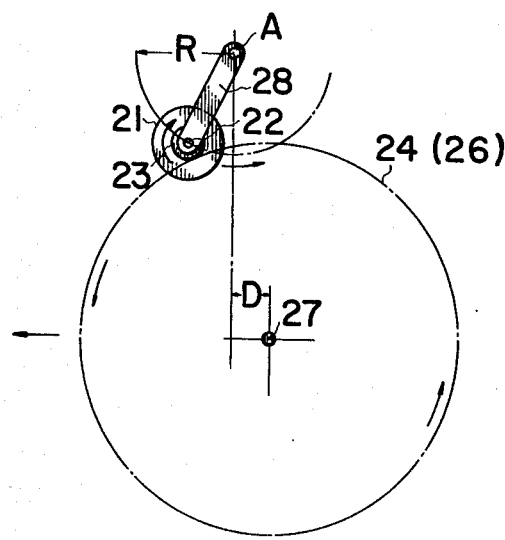

The first embodiment of the present invention will be explained hereinafter referring to the accompanying drawings. The principle of the present embodiment will be explained referring to FIG. 2. A motor 21 which is provided with a driving roller 23 to convey the driving force to a wheel 26 by contacting with a tire 24 from its outside is fixed at one end of a swing-arm 28. Another end of the swing-arm 28 is supported in the freely rotatable manner by a fulcrum A which is provided at the upper and outer position of the wheel 26. The fulcrum A is provided at the upper and outer position of the wheel 26 which is apart from a wheel axle 27 by a certain distance D toward the running direction of the bicycle. Moreover the swinging radius R of the swing-arm 28 (i.e. the length of the arm) is made in the degree that the swinging circular arc of the arm 28 and the outer periphery of wheel 26 (tire 24) intersect at a certain angle, i.e. the driving roller 23 contacts with a periphery of the tire 24 at a certain angle. Therefore if the swing-arm 28 swings in the direction opposite to the running direction of the bicycle, the driving roller 23 is thrusted onto the tire 24.

Figure 3:
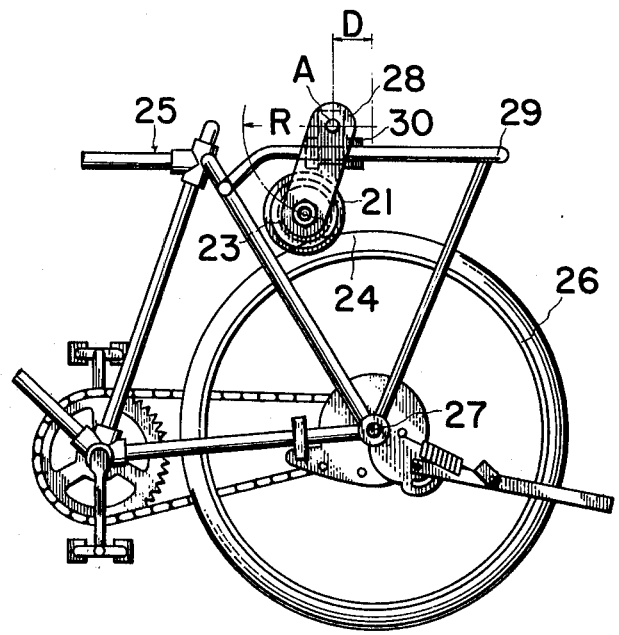
Figure 4:
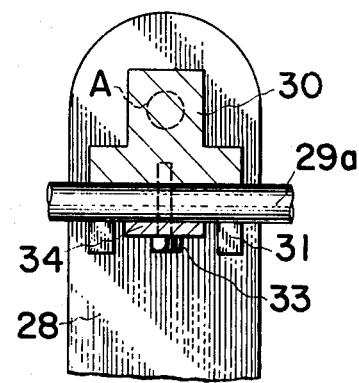
Figure 5:
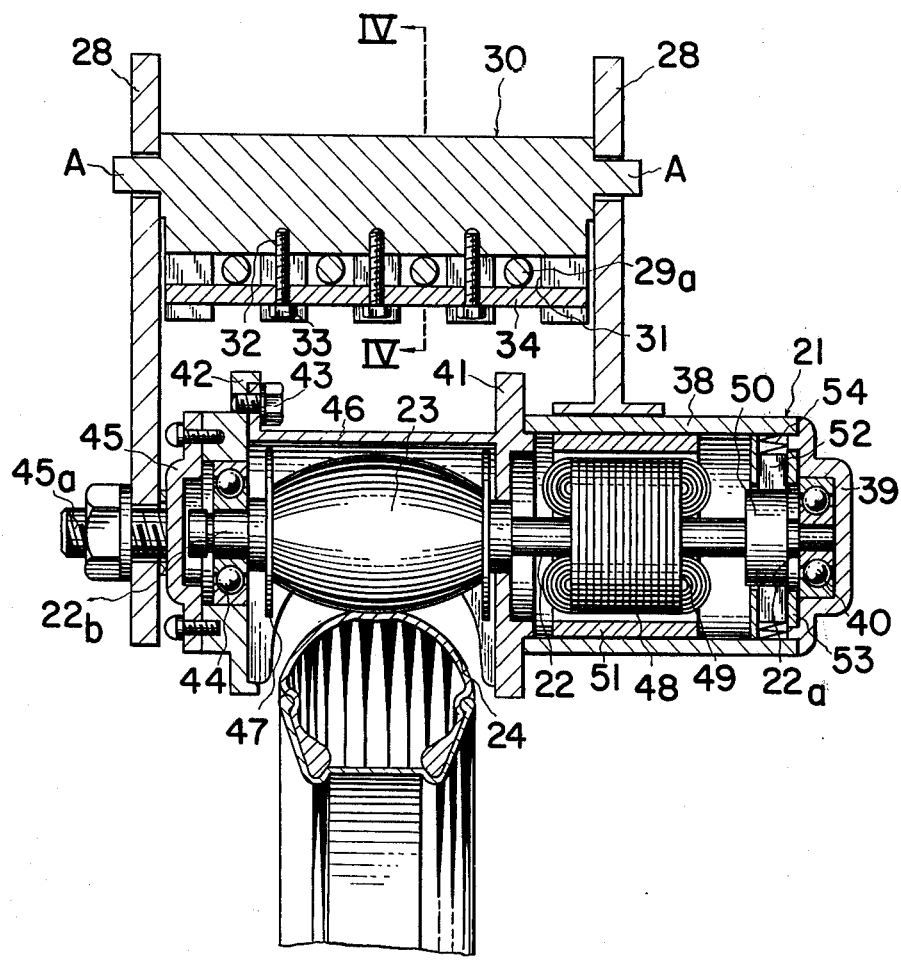

The concrete embodiment of the present invention will be explained referring to FIGS. 3 – 5. As shown in FIG. 3, a swing-arm fixing unit 30 is provided at a part of a carrier 29 fixed to a bicycle body 25 which is positioned forward from the wheel axle 27 by a certain distance D. As shown in FIGS. 4 and 5, at the lower surface of the fixing unit 30, grooves 31 for respectively fitting each tube 29a of the carrier 29 are cut in the shape of comb-teeth, and screw holes 32 are made respectively between each groove 31. Thereafter the grooves 31 are respectively suited to each tube 29a, a fixing plate 34 is put at the rear side of the tubes 29a, and the swing-arm fixing unit 30 is fastened to be fixed to the carrier 29 through bolts 33.

At the upper part of the fixing unit 30, the fulcrum A of the swing-arm 28 is protruded, and one end of the swing-arm 28 is supported in the freely rotatable manner by the fulcrum A. A motor 21 is fixed at another end of the swing-arm 28 at the position of the above-mentioned certain radius R.

Figure 1:
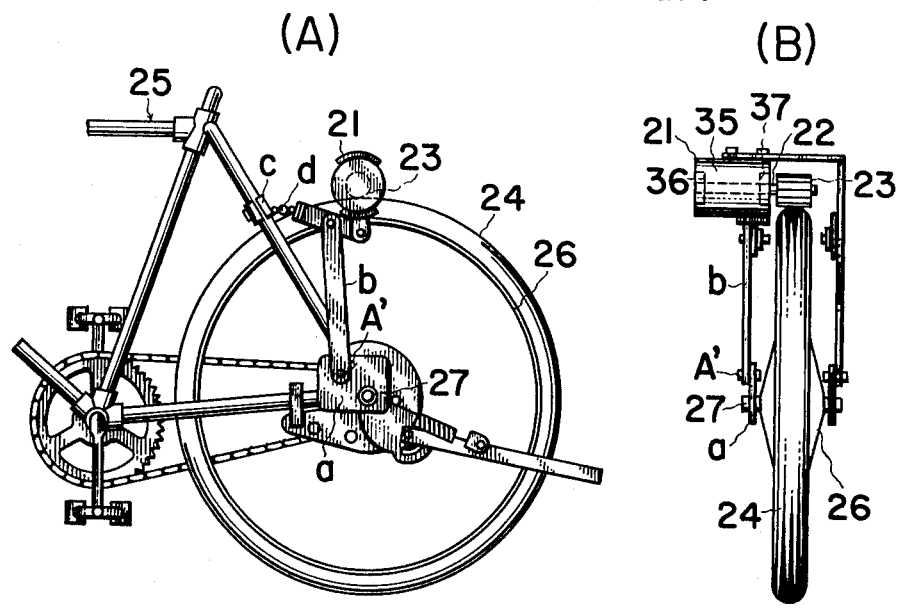
FIGS. 1 (A) and 1 (B) are respectively a partial side elevation view and a back elevation view showing a conventional electric bicycle.

In the present embodiment, the swing-arms 28 are supported at both ends of the fixing unit 30, a periphery of a yoke of the motor 21 is fixed to one arm 28, and a motor shaft 22 is supported in the freely rotatable manner by another arm 28 opposite to the motor 21 with the driving roller 23 between. However it is also possible that only the periphery of the motor 21 is fixed as shown in FIG. 1, and the motor 21 is fixed by the swing-arm 28 in the manner the driving roller 23 is held at only one side. Moreover the swing-arm fixing unit 30 may be fixed to the carrier upside-down so as to place the fulcrum A at the lower side of the carrier 29, however the above condition should be satisfied.

In the present embodiment of the above structure, in case it is used as an electric bicycle, the swing-arm 28 is swung in the opposite running direction around the fulcrum A and the driving roller 23 is contacted with the tire 24 from the outside. Namely the roller 23 contacts with the tire 24 within the range restricted by the arm 28. Since the fulcrum A of the arm 28 is placed forward in comparison with the wheel axle 27 and the swinging circular arc of the arm 28 and the outer periphery of the wheel 26 intersect at a certain angle, if the arm 28 swings in the opposite running direction, the driving roller 23 is strongly pushed to the tire 24. Therefore since when the motor 21 rotates so as to move the bicycle forward, the roller 23 rotates and drives the wheel 26 revolving on the preiphery of the tire 24, the arm 28 swings in the opposite running direction and pushes the roller 23 onto the tire 24. Namely, in case a large driving force is required, the driving roller 23 is pushed onto the tire 24 and the frictional force between the roller 23 and the tire 24 becomes large, so that the driving force can be conveyed surely, and on the contrary, in case a small driving force is enough, the pressure force of the roller 23 becomes small, and thereby the driving force proportional to a load is conveyed.

The result of the aforesaid first embodiment of the present invention will be described hereinafter.

1. Since the driving roller is pressed onto the tire in proportion to a load, the slip does not occur, a proper driving force proportional to a load can be obtained, and the running distance per one storage battery can be extended.

2. Since numbers of parts required is small, it can be manufactured cheap.

3. Since the attachment is required only for the outside of the carrier, etc., the attachment work becomes very easy.

4. Since this part is small and futher the motor is placed under the carrier, etc., the design of the whole bicycle is not injured.

Other features of the present invention will be explained referring to FIGS. 3 – 8.

In the electric bicycle shown in FIG. 1, a motor shaft 22 which is supported by bearings 36 and 37 provided at both ends of a yoke 35 of a motor 21 is protruded outward, a driving roller 23 is put around the protruded end of the shaft 22, and the roller 23 is pressed onto the tire 24 to convey its driving force. Therefore, since the shaft 22 is supported at one side of the roller 23 (i.e. only one side is held against the pressure), there is a defect that the bearing 37 closer to the roller 23 receives the excessive weight and that side of the shaft 22 is worn unsymmetrically faster and the durability is deteriorated. Moreover as for a rod b for connecting the motor 21 with a bicycle body 25, a side closer to the motor 21 is worn faster, and thereby there is an anxiety unbalance of pressure force is caused and vibration occurs.

Further since the driving roller 23 is not covered, there is a defect that when the bicycle is used on a rainy day, muddy water is splashed to the forward part of the body 25 by a centrifugal force due to the driving direction of the roller 23, and the body 25 and clothes of a bicycle rider become dirty.

The object of the structure of the motor is to eliminate the above defect. The feature is to uniformalize the weight to the shaft and the bearing by supporting the motor shaft at both sides of the driving roller and further to make it possible that a bicycle rider is protected from a splash of muddy water due to the roller as required.

In the motor 21 of the present structure shown in FIG. 5, the periphery of the yoke 38 of the motor 21 is attached to the swing-arm 28 in the manner it is freely swingable around the top of tye tire 24. An end cap 39 is set to the opposite end of the yoke 38 which is not adjacent to the tire 24, and one end 22a of the motor shaft 22 is supported by a bearing 40 set at the center of the cap 39. On the other hand a cap 41 is set to the end of the yoke 38 adjacent to the tire 24, and an end bracket 42 which is facing to the motor 21 with the driving roller 23 between is fixed to the cap 41 through a bolt 43. A bearing 44 is set at the center of the end bracket 42, and another end 22b of motor shaft 22 is supported by the bearing 44. Moreover a cap 45 for protecting from dust is fixed to the outside of the shaft 22 and the bearing 44 of the bracket 42, and another swing-arm 28 is supported by a shaft 45a protruded from the center of the cap 45.

In the present embodiment, a cover 46 for protecting from the splash of muddy water due to the rotation of the driving roller 23 is formed at the upper part between the end of the cap 41 adjacent to the yoke 38 and the bracket 42 as it covers the upper part of the driving roller 23. Moreover, in this embodiment, the end bracket 42 is connected with the cap 41 through the cover 46 as one body, however it is also possible that the end bracket 42 is supported by the swing-arm 28 and is placed opposite to the yoke 38 of the motor 21 with the driving roller 23 between, and the both ends of the roller 23 are supported independently.

In the drawing, 47 is holding plates put at both sides of the driving roller 23, 48 is a core, 49 is a coil wound around the core 48, 50 is a commutator, 51 is a magnet for magnetization put inside the yoke 38, 52 is a brush for electrifying the commutator 50, 53 is a plate to which the brush is attached, and 54 is a spring.

In the motor of the abovementioned structure, the conventional structure to support only one side is abolished, and the both ends of the motor shaft 22 are supported by the end cap 39 of the motor 21 and the end bracket 42 provided at the opposite side of the driving roller 23. Therefore in comparison with the conventional motor, the center of the gravity is moved to the side of the driving roller (left side in FIG. 5), the weight distribution is improved, and further the weight given to the driving roller 23 is uniformalized.

The effects of the abovementioned structure of the motor are as in the following;

1. Since the both sides of the driving roller are supported, the force for pressing the roller to the tire is divided and is given to the both supporting ends, so that the degree of the abrasion is decreased and the durability is improved.

2. Since the supporting parts are provided at both ends of the driving roller, a cover to protect a bicycle body and a bicycle rider from a splash of muddy water due to the driving roller can be easily provided as required.

One more feature shown in FIG. 5 will be explained hereinafter.

In the conventional one, as shown in FIG. 1 the driving roller 23 is made into a cylinder shape from a metal or a resin and a pattern of vertical stripes or the like is put on the cylinder so that the roller can be pressed onto the tire strongly. In such a driving roller, the central part of the roller to be pressed onto the tire is worn down fast. If the said abrasion occurs, the driving force of the driving roller becomes minimum at the central part and becomes large at parts away from the central part. For this reason the driving forces at the central part and the end parts contacting with the tire become different, and thereby there are some defects that the driving roller causes a hop-vibration and the bicycle riding condition is deteriorated, and that abnormal abrasion occurs and the durability of the driving roller is deteriorated.

The object of the structure of the driving roller is to eliminate the above defects. The feature is to form the driving roller into a beer barrel shape and to always press a point which driving force is maximum to the tire so that the driving efficiency and the durability are improved.

As shown in FIG. 5, the driving roller 23 of this feature has a beer barrel shape in which the central part has a maximum diameter and the diameter of the part closer to the both ends becomes small. Therefore the force for driving the tire 24 is maximum at the central part of the driving roller 23 and becomes small at the part closer to the both ends.

For this reason, in the driving roller 23 of the present structure, the part having the maximum driving force is pressed to the highest position of the tire 24 always within the range of the thrust of the motor shaft 22, and the abrasion of the driving roller 23 starts from the central part which driving force is maximum. Therefore the abrasion only broaden the area of the driving roller to contact with the tire 24 and abnormal abrasion due to vibration does not occur, so that the driving force is increased, slip and vibration do not occur, and the durability is improved.

One example of a vibration absorbing device is employed for the electric bicycle of the present invention as required will be explained hereinafter referring to FIGS. 6 and 7.

In the method of attaching the motor 21 shown in FIG. 1, a vibration parallel to the running direction of a bicycle which is easily caused by the motor 21 can not be absorbed, and according to this vibration a stable pressure of the driving roller 23 to the tire 24 is damaged, and thereby there is an anxiety that the stability of the bicycle running is disturbed.

The present device is to solve the above problem. As shown in FIG. 6, the device consists of an inner tube 55, an outer tube 56 and a spring 57 inserted inside the both tubes. One end of the spring 57 is fixed around a pin 58 and another end is fixed around a pin 59. The inner tube 55 is inserted inside the outer tube 56 in the freely slidable manner. The both tubes 55 and 56 are freely slidable in the arrow direction and they keep always a determined length by the function of the spring 57.

The method of attaching this vibration absorbing device will be explained. As shown in FIG. 7, the pin 58 of the inner tube 55 is attached to an attaching plate 60 provided at the outer surface of the motor 21 or the cover 46 and the pin 59 of the outer tube 56 is attached to a seat-stay respectively supporting the tubes 55 and 56 in the freely rotatable manner. At the time of this attachment, the motor 21 supported by the pin 58 of the inner tube 55 is placed at the position where the driving roller 23 is pressed to the tire 24 and the spring 57 inside the vibration absorbing device is in the most stable condition.

The function of the vibration absorbing device is the absorb and relieve the vibration which is caused by the thrust of the driving roller 23 to the tire 24 and the eccentricity of the tyre 24 at the time of starting the motor 21 and the vibration parallel to the running direction of a bicycle caused by the motor 21 during the bicycle running by the function of the spring 57 inside the tubes accordant to the slide of the inner tube 55, and simultaneously the pressure-contact between the driving roller 23 and the tire 24 is made stable.

Moreover since the vibration absorbing device accepts only the vibrations of one direction, i.e. parallel to the bicycle running direction, the vibration of the direction of the axial core of the motor 21 is prevented, the vibration of the direction rectangular to the running direction is prevented by the swing-arm 28, and the motor is always in the stable position and further works stably.

The present device has advantages as in the following;

1. Since the vibration caused by the motor is absorbed, the running stability becomes higher.

2. Since the driving roller is always pressed to the tire, the loss of the energy due to the idling of the roller does not occur.

3. Since the spring is put inside the tubes, there is no anxiety that the efficiency is deteriorated by the corrosion of the spring.

Hereinafter a switch for running an electric bicycle, i.e. a driving switch or a motor will be explained.

In a conventional electric bicycle, the switch is attached to a right end grip of a handlebar and further the motor is electrified and driven only while a button is pushed. For this reason at the time of turning to the right hand side on a road, if the right hand is used for a hand-signal, the driving force is not obtained and pedalling is required, thereby there is a defect that the function of an electric bicycle is lost. In this case, since there are many right-handed persons, if the left hand is used for a hand-signal, unstability occurs and there is a dangerous aspect for a bicycle riding. (Especially this is found in woman.)

The object of the present switch is to eliminate the above defect and to provide a switch easy for operation and safe for riding.

One example of the present switch will be explained hereinafter referring to FIG. 8. As shown in FIG. 8, switches 62 and 63 are inserted in parallel with each other in a driving circuit 61 of the motor 21. Namely the switches 62 and 63 are placed between the motor 21 and a power source 64 in parallel with each other and respectively in series with regard to the motor 21. A power source switch 65 is connected with the power source 64.

Moreover the switches 62 and 63 are push-button switches to be operated with hand, and only while push-buttons 62a and 63a are pushed, the motor 21 is electrified, and if the hand pushing the button is released, electrification is stopped. The switches 62 and 63 are attached respectively around left and right hand grips of a handlebar of the electric bicycle.

The working of the switches of the abovementioned structure will be explained. In case a bicycle is used as an electric one, first the power source switch 65 is turned on so that the motor can be electrified. Next after the driving roller 23 of the motor 21 is pressed to the tire 24, the push-button 62a or 63a of the left or right switch 62 or 63 is pushed by hand for the bicycle to run. Therefore according to the present switches, the bicycle can run while the left or right switch 62 or 63 is pushed. Namely if the push-button 62a is pushed, the motor 21 is electrified from the power source 64 through the power source switch 65 and the switch 62 and starts its rotation, the driving force is conveyed to the tyre 24 by the driving roller 23, and the bicycle starts to run.

In order to stop the bicycle, if the hand is released from the both push-buttons 62a and 63a, the electrification for the motor 21 is stopped and the driving force is not obtained. Thereafter if a brake-lever is clutched, the brake (of a normal bicyle) is applied and further the pressure force of the driving roller 23 of the motor 21 works as a brake, and the bicycle is stopped.

The abovementioned switch has effects as in the following;

1. Since when a brake is applied at a dangerous time, a hand is released from the push-button, the electrification is naturally stopped and further the pressure force of the driving roller to the tyre works as a brake, and thereby the bicycle can stop quickly. This is in agreement with instinctive action of a human being that a hand is released in case of danger.

2. When the driving force is not required on a descent and the like, the driving of the motor can be easily stopped, and thereby power consumption can be prevented.

3. Speed control is possible in a negative sense.

4. The motor can be driven by pushing one switch for running a bicycle.

5. In case of turning to the right hand side on a road, the left switch is pushed and a hand signal by a right hand is possible, so electrification for the motor is not stopped.

6. In case tiredness is caused by pushing the button with one hand for a long time, it is possible to change to another hand.

Figure 9:
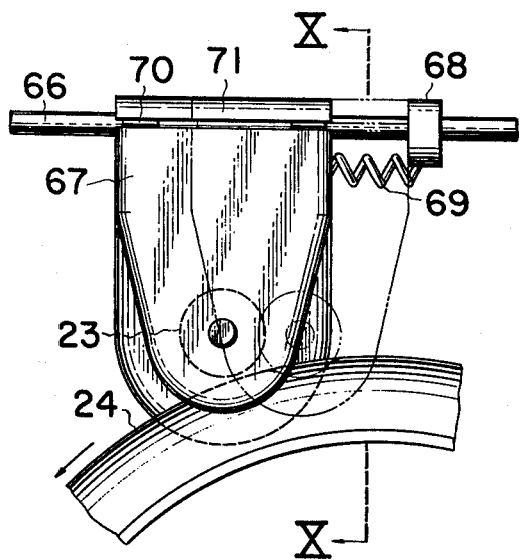
Figure 10:
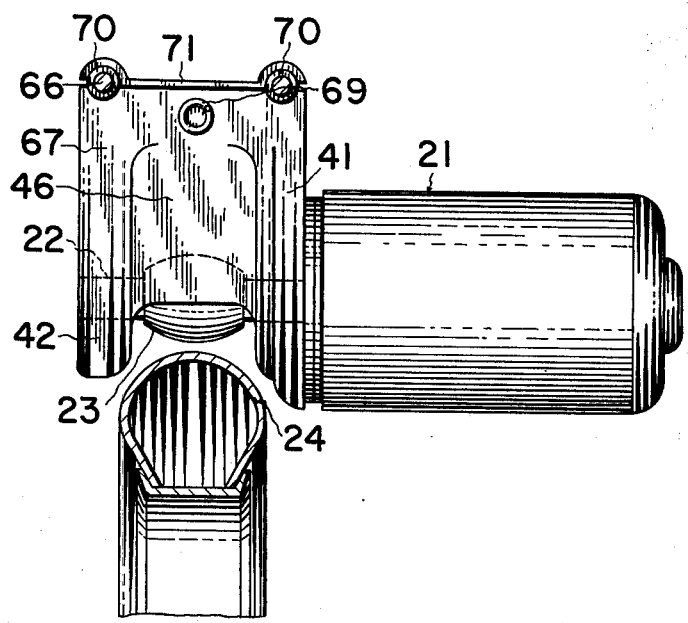

The second embodiment of the present invention will be explained hereinafter referring to FIGS. 9 and 10. As shown in FIGS. 9 and 10, this embodiment is composed of guide rails 66, a sliding part 67 provided on the guide rails 66 in the freely slidable manner, a stopper 68 fixed on the guide rails 66 and a spring 69 for connecting the sliding part 67 and the stopper 68. The sliding part 67 is freely slidable on the guide rails 66 by being held at its head part 71 through bushings 70 putting a carrier or the guide rails 66 provided in parallel with the carrier in the part 67.

Furthermore the sliding part 67 and its head part 71 are provided with a holder of a bolt and the like which can be freely removed. A motor 21 is attached to the sliding part 67 in the manner that a rotating shaft of the motor 21 is parallel to a wheel axle 27, and a driving roller 23 is provided on the motor shaft 22.

The working point of the present embodiment will be explained. FIGS. 9 and 10 show the condition that a normal bicycle in which the motor 21 is not driven is running. The driving roller 23 which is in contact with the tire 24 by the working of the spring 69 while the bicycle is stopped is pushed in the direction opposite to the spring together with the sliding part 67 by the rotation of the tire 24 in the arrow direction at the time of running, and thereby a condition on no-resistance or very small resistance occurs as shown in the drawings and it becomes possible to run as a normal bicycle.

A two-dotted line of FIG. 9 shows the condition that the motor 21 is working. When the driving roller which is pressed to the tire 24 while the bicycle is stopped starts to drive by the working of the motor 21, the driving roller 23 thrusts onto the tyre 24 by the self-force and that thrusting continues until the sliding part 67 moving on the guide rails 66 together with the roller 23 contacts with the stopper 68. The amount of the thrusts of the driving roller 23 onto the tire 24 changes automatically from time to time, for example since at the time of running up on an ascent a larger driving force is required, the amount is larger than that of the time of running on a plain road. The driving force displays the maximum efficiency at the position where the thrust of the roller 23 is stopped by the stopper 68.

The effects of the present embodiment are in the following;

1. Only by the switch for working the motor, the driving roller automatically thrusts onto the tyre to run a bicycle with the motor, or a normal bicycle running with a pedal is possible by removing it.

2. The driving force can be effectively conveyed by the working of the spring 69 and the stopper 68.

We claim:

1. In the combination of a bicycle having a frame and two wheels and an electric motor for propelling said bicycle, the improvement comprising:
    a swing arm;
    means for pivotally mounting said swing arm at one end to said bicycle frame at a position above the uppermost portion of one of said wheels and forward of a vertical line passing through the axle of said wheel;
    a drive roller rotatably mounted to the other end of said swing arm, said drive roller being in contact with said wheel and driven by said electric motor;
    said mounting means, when the drive roller is in contact with said wheel, positioning said swing arm relative to said wheel to form an angle whereby the radial force applied by the drive wheel is a function of the driving force of said electric motor; and
    an electrical circuit including a pair of switches attached to said bicycle at two spaced locations, a power switch and a power supply, said pair of switches are in parallel with each other and in series with said power switch, said electric motor and said power supply, said pair of parallel switches being located on the right and left portions of a handlebar of said bicycle respectively such that actuation of said electric motor may be controlled from at least two spaced locations.

2. The combination of claim 1 wherein said mounting means pivotally mounts said swing arm to a carrier on said bicycle above the rear wheel of said bicycle.

3. The combination of claim 1 wherein said drive roller is convex shaped having the central part of maximum diameter and making contact with said wheel at said central part.

4. The combination of claim 3 wherein said drive roller is fixed on one end of the drive axle of said electric motor and said swing arm includes two parallel arms, and including a cap supporting said end of said driving axle in a freely rotatable manner, said cap being mounted to one of said swing arms and said electric motor to the other of said swing arms.

5. The combination of claim 4 including a cover supported between said electric motor and said cap covering at least the upper part of said drive roller.

6. The combination of claim 1 including a first tube having one end supported by a seat pin of said bicycle, a second tube having a first end telescopically received in the other end of said first tube and a second end supported by said swing arm, and a spring inside both of said tubes urging them to separate.

7. The combination of claim 1 wherein said pair of switches are biased to be normally open and are closed by constant manual pressure.

* * * * *